(12) United States Patent
Udayakumaran

(10) Patent No.: US 11,243,752 B2
(45) Date of Patent: Feb. 8, 2022

(54) MULTI-VERSION SHADERS

(71) Applicant: Advanced Micro Devices, Inc., Santa Clara, CA (US)

(72) Inventor: Sumesh Udayakumaran, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/509,165

(22) Filed: Jul. 11, 2019

(65) Prior Publication Data

US 2021/0011697 A1   Jan. 14, 2021

(51) Int. Cl.
| | |
|---|---|
| *G06F 15/00* | (2006.01) |
| *G06F 8/41* | (2018.01) |
| *G06T 15/06* | (2011.01) |
| *G06T 15/00* | (2011.01) |
| *G06F 8/71* | (2018.01) |

(52) U.S. Cl.
CPC ............... *G06F 8/49* (2013.01); *G06F 8/71* (2013.01); *G06T 15/005* (2013.01); *G06T 15/06* (2013.01)

(58) Field of Classification Search
CPC .......... G06T 1/20; G06T 15/005; G06T 1/60; G09G 5/363; G06F 3/14

USPC ........................................................ 345/501
See application file for complete search history.

(56) References Cited

U.S. PATENT DOCUMENTS

| | | | |
|---|---|---|---|
| 7,750,913 B1 * | 7/2010 | Parenteau | G06T 15/005 345/502 |
| 2013/0265308 A1 * | 10/2013 | Goel | G06T 15/005 345/426 |
| 2018/0114290 A1 * | 4/2018 | Paltashev | G06T 15/005 |
| 2020/0082059 A1 * | 3/2020 | Vembu | H04N 21/2541 |

* cited by examiner

*Primary Examiner* — Gordon G Liu
(74) *Attorney, Agent, or Firm* — Volpe Koenig

(57) ABSTRACT

Described herein are techniques for generating a stitched shader program. The techniques include identifying a set of shader programs to include in the stitched shader program, wherein the set includes at least one multiversion shader program that includes a first version of instructions and a second version of instructions, wherein the first version of instructions uses a first number of resources that is different than a second number of resources used by the second version of instructions. The techniques also include combining the set of shader programs to form the stitched shader program. The techniques further include determining a number of resources for the stitched shader program. The techniques also include based on the determined number of resources, modifying the instructions corresponding to the multiversion shader program to, when executed, execute either the first version of instructions, or the second version of instructions.

20 Claims, 6 Drawing Sheets

MULTI-VERSION SHADERS

BACKGROUND

Ray tracing is a type of graphics rendering technique in which simulated rays of light are cast to test for object intersection and pixels are colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein.

DETAILED DESCRIPTION

Described herein are techniques for generating a stitched shader program. The techniques include identifying a set of shader programs to include in the stitched shader program, wherein the set includes at least one multiversion shader program that includes a first version of instructions and a second version of instructions, wherein the first version of instructions uses a first number of resources that is different than a second number of resources used by the second version of instructions. The techniques also include combining the set of shader programs to form the stitched shader program. The techniques further include determining a number of resources for the stitched shader program. The techniques also include, based on the determined number of resources, modifying the instructions corresponding to the multiversion shader program to, when executed, execute either the first version of instructions, or the second version of instructions.

Figure 1:
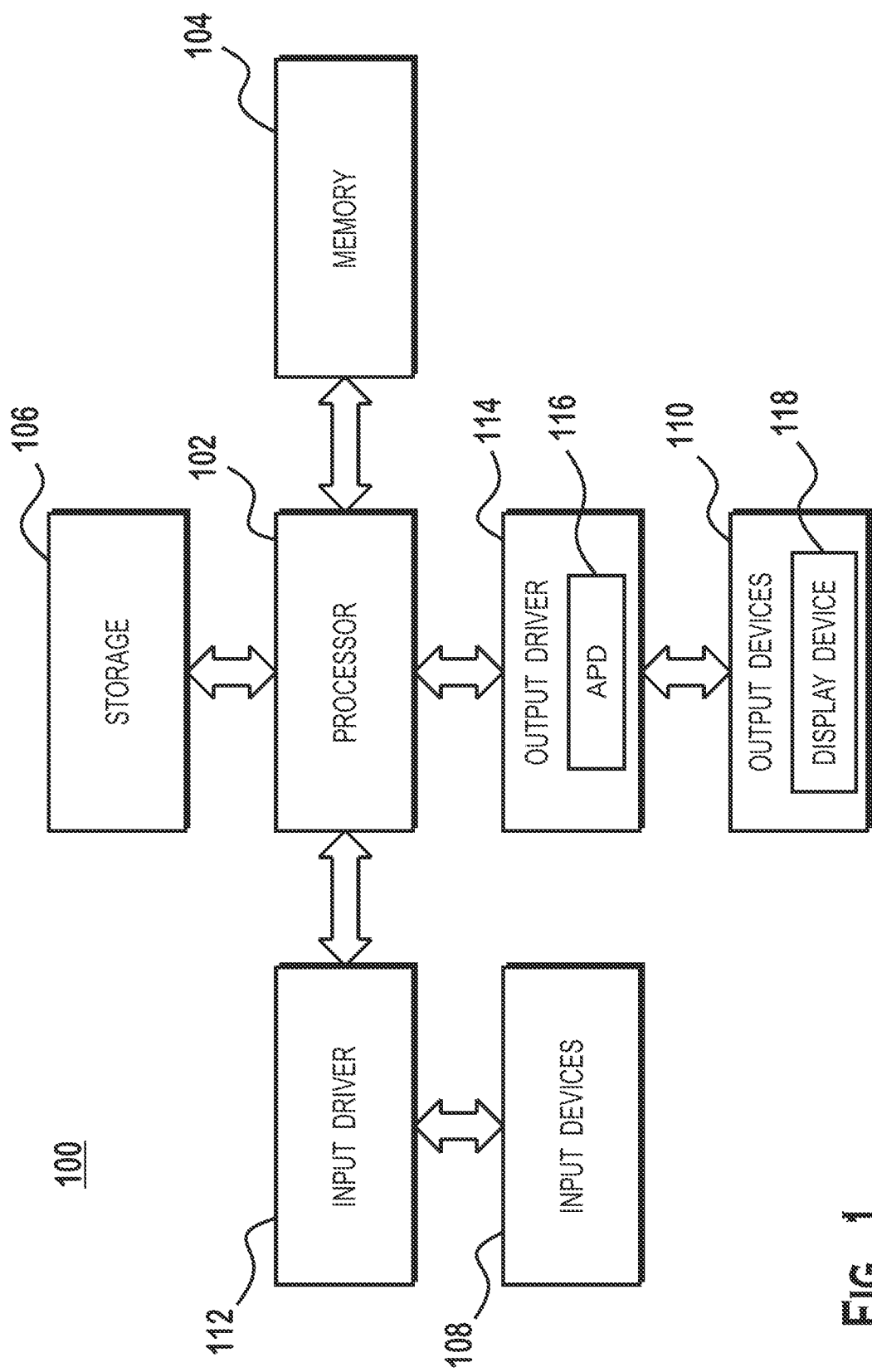
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
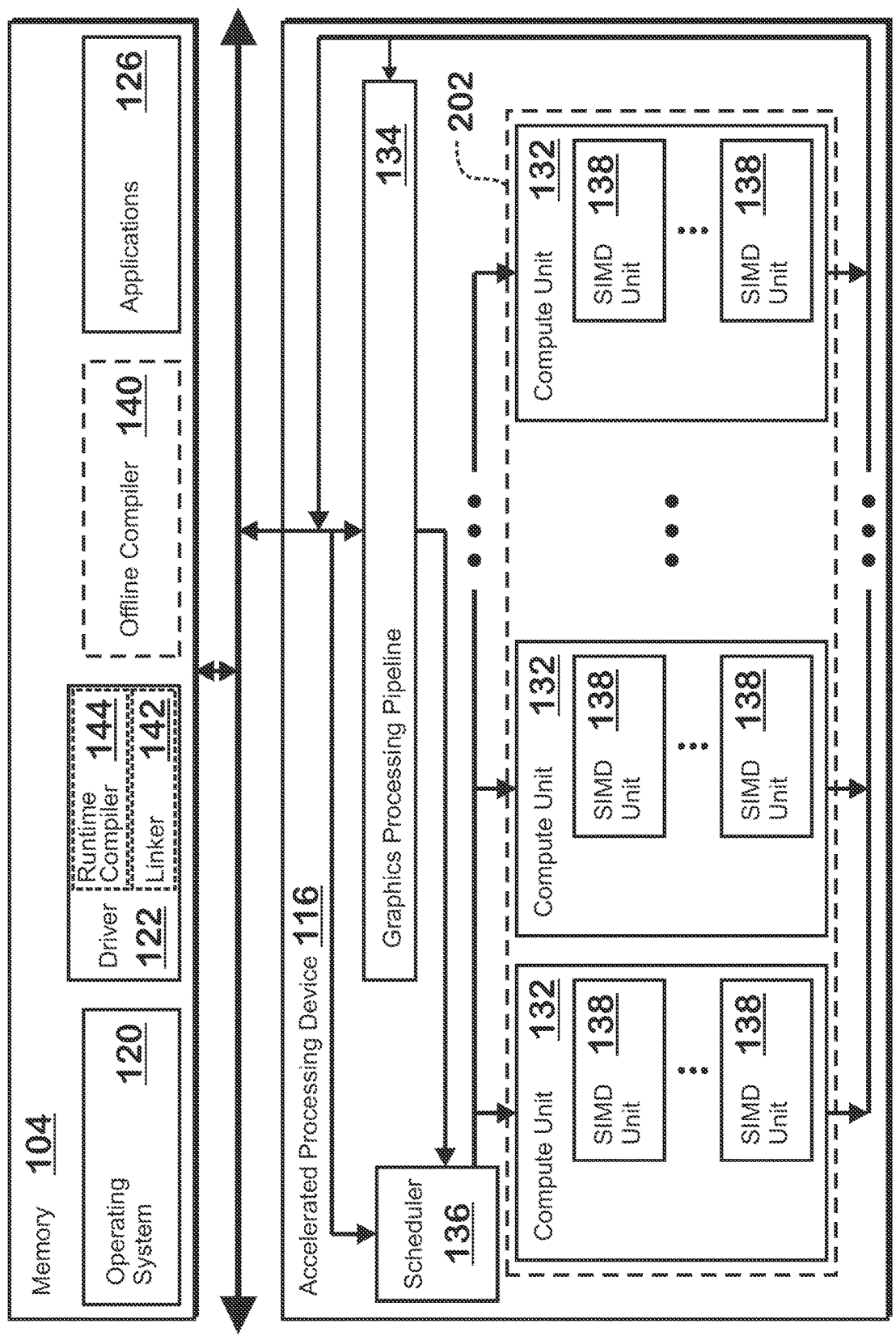
FIG. 2 is a block diagram of the device, illustrating additional details related to execution of processing tasks on the accelerated processing device, according to an example.

FIG. 2 is a block diagram of the device 100, illustrating additional details related to execution of processing tasks on the APD 116, according to an example. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not related, or not directly related to graphics operations, such as operations related to video, physics simulations, computational fluid dynamics, or other tasks, based on commands received from the processor 102. The APD 116 also executes compute processing operations that are related to ray tracing-based graphics rendering.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed together as a "wavefront" on a single SIMD processing unit 138. The SIMD nature of the SIMD processing unit 138 means that multiple work-items may execute in parallel simultaneously. Work-items that are executed together in this manner on a single SIMD unit are part of the same wavefront. In some implementations or modes of operation, a SIMD unit 138 executes a wavefront by executing each of the work-items of the wavefront simultaneously. In other implementations or modes of operation, a SIMD unit 138 executes different sub-sets of the work-items in a wavefront in parallel. In an example, a wavefront includes 64 work-items and the SIMD unit 138 has 16 lanes (where each lane is a unit of the hardware sized to execute a single work-item). In this example, the SIMD unit 138 executes the wavefront by executing 16 work-items simultaneously, 4 times.

One or more wavefronts are included in a "workgroup," which includes a collection of work-items designated to execute the same program. An application or other entity (a "host") requests that shader programs be executed by the accelerated processing device 116, specifying a "size" (number of work-items), and the command processor 136 generates one or more workgroups to execute that work. The number of workgroups, number of wavefronts in each workgroup, and number of work-items in each wavefront correlates to the size of work requested by the host. In some implementations, the host may specify the number of work-items in each workgroup for a particular request to perform work, and this specification dictates the number of workgroups generated by the command processor 136 to perform the work. As stated above, the command processor 136 dispatches workgroups to one or more compute units 132, which execute the appropriate number of wavefronts to complete the workgroups.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The accelerated processing device 116 implements ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below.

Shader programs to be executed on the APD 116 are compiled from source code into machine instructions. Such compilation may occur in one or more stages. In some examples, an offline compiler 140 (where "offline" is differentiated from a runtime compiler 144) compiles the shader programs to an intermediate format and, as the application 126 is being loaded for execution, a runtime compiler 144 compiles the shader programs to a final format with machine instructions. Some examples of the intermediate format include LLVM IR (low level virtual machine intermediate representation) or HSAIL (heterogeneous system architecture intermediate language). In some implementations, a runtime linker 142 links multiple compiled shader programs into larger composite or "stitched" shader programs. In some situations, the offline compiler 140 is present on the computer system of an application developer, but not on a computer system of an end user that runs the application. In some situations, the runtime compiler 144 and linker 142 are not present on the same computer system as an offline compiler 140. Thus although the two compilers and the linker (offline compiler 140, runtime compiler 144, and linker 142) are illustrated together in a memory 104, it should be understood that systems including only one or two of these components also fall within the scope of this disclosure. In some implementations, the offline compiler 140, runtime compiler 144, and linker 142 are embodied as software programs that execute on a processor such as processor 102.

Some workloads involving shader programs are complex, involving the execution of different shader programs based on the results of conditional evaluations whose results can vary with each instance of execution. In the example of ray tracing, one ray may hit a first triangle having a first material and thus requiring a first material shader, and another ray may hit a second triangle having a second material and thus requiring a second material shader. Moreover, in some instances, it is only possible to determine at runtime, the specific shader programs that can be executed for a particular application. In such situations (or in various other situations), multiple shader programs are compiled and then stitched together into a larger shader program by the linker 142. In such a stitched shader program, the individual shader programs that comprise the stitched shader program may still be referred to herein as shader programs or shaders, or may alternatively be referred to as "sub-shader programs." With a stitched shader program, at various stages of execution, the stitched shader program selects one of several sub-shader programs to execute. In other words, such a stitched shader program includes multiple shader programs in a group of alternative shader programs, and each work-items selects one the alternative shader programs. This selection is accomplished by including each of the sub-shader programs in the stitched shader program and including instructions for selection of a shader program based on execution-time criteria. In an example, a switch statement evaluates a variable and jumps to a particular sub-shader program based on the value stored in the variable. Any other technically feasible mechanism to select a particular sub-shader program may alternatively or additionally be used.

Figure 3:
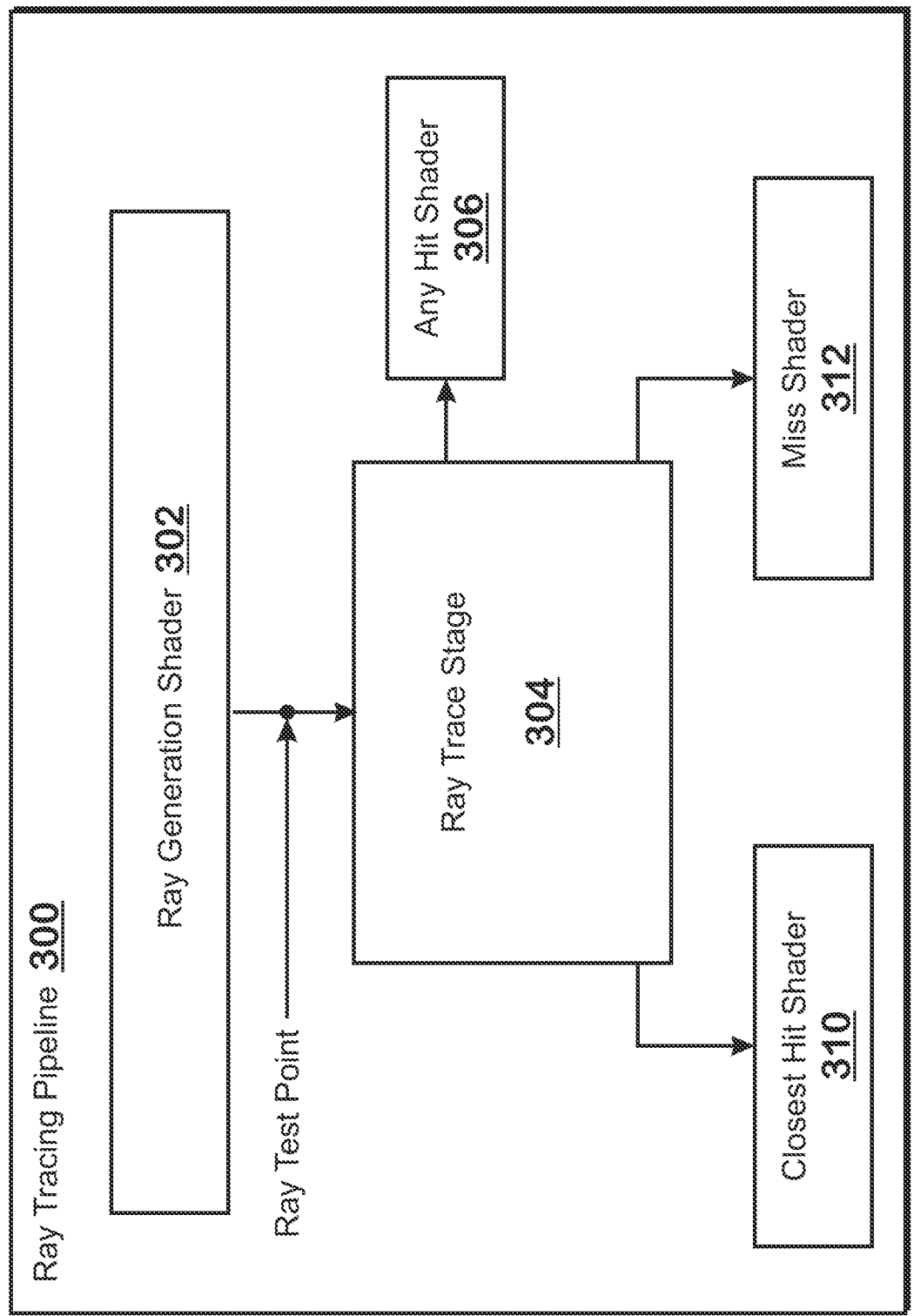
FIG. 3 illustrates a ray tracing pipeline for rendering graphics using a ray tracing technique, according to an example.

One example workload for which a stitched shader program may be useful is ray tracing. FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, closest hit shader 310, and miss shader 312 are shader-implemented stages that represent ray tracing pipeline stages whose functionality is performed by shader programs executing in the SIMD units 138. Any of the specific shader programs at each particular shader-implemented stage are defined by application-provided code (i.e., by code provided by an application developer that is pre-compiled by an application compiler such as compiler 140 and/or compiled by a compiler in the driver 122 such as runtime compiler 144 and linker 142). The ray trace stage 304 performs a ray intersection test to determine whether a ray hits a triangle. The ray trace stage 304 may be performed by a shader program executing in the SIMD units 138 or by fixed function hardware configured to perform ray intersection tests.

The various programmable shader stages (ray generation shader 302, any hit shader 306, closest hit shader 310, miss shader 312) are implemented as shader programs that execute on the SIMD units 138.

The ray tracing pipeline 300 operates in the following manner. One or more compute units 132 execute a ray generation shader 302. The ray generation shader 302 requests the ray trace stage 304 to perform one or more ray intersection tests. Each ray intersection test defines an origin and direction for a ray trace operation, which determines whether the ray hits one or more triangles or whether the ray does not hit any triangle.

The ray trace stage 304 identifies one or more triangles intersected by a ray for a ray intersection test, or, if no triangles are intersected by the ray up to a given distance, determines that the ray does not hit any triangles (i.e., that the ray "misses"). The ray trace stage 304 may be implemented in any technically feasible manner. In one example, the ray trace stage 304 is implemented as a shader program executing on one or more compute units 132. In another example, the ray trace stage 304 is implemented as fixed function hardware.

Ray trace stage 304 triggers execution of a closest hit shader 310 for the triangle closest to the origin of the ray that the ray hits, or, if no triangles were hit, triggers a miss shader. A typical use for the closest hit shader 310 is to color a material based on a texture for the material. A typical use for the miss shader 312 is to color a pixel with a color set by a skybox. It should be understood that the shader programs defined for the closest hit shader 310 and miss shader 312 may implement a wide variety of techniques for coloring pixels and/or performing other operations.

A typical way in which ray generation shaders 302 generate rays is with a technique referred to as backwards ray tracing. In backwards ray tracing, the ray generation shader 302 generates a ray having an origin at the point corresponding to a camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination (e.g., an average) of the colors determined for each of the rays of the pixel. Any particular ray generation shader 302 (or any other shader) may also specify that an any hit shader 306 is to be executed for any of the hits between a ray and a triangle, even if such hits are not the closest hit.

It is possible for the closest hit shader 310 and/or miss shader 312 to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color at the hit location to the pixel corresponding to the closest hit shader 310 that spawned the rays. It should be understood that although some examples of ways in which the various components of the ray tracing pipeline 300 can be used to render a scene have been described, any of a wide variety of techniques may alternatively be used.

It should be understood that any shader program written for the closest hit shader stage 310, miss shader stage 312, or any hit shader stage 306, may implement any of the operations described elsewhere herein as being performed by shader programs written for the ray generation stage 302. For example, in addition to spawning new rays to be provided to the ray test point for testing at the ray trace stage 304, such shader programs may specify whether misses or hits should spawn additional rays to trace (starting again at the ray test point), what shader programs to execute for any such additional rays, how to combine the color and/or luminosity values generated by such additional shader program executions, and any other operations that could be performed by a ray generation shader 302.

The ray tracing pipeline may be implemented as a stitched shader. More specifically, each of the shader programs for the different stages of the ray tracing pipeline may be compiled (e.g., by compiler 140 and/or runtime compiler 144) and linked together (e.g., by linker 142) into a single stitched shader program, with the compiler or linker also include transition and control instructions that manage that control flow between the different stages of the ray tracing pipeline as well as provide inputs and export outputs from the ray tracing pipeline.

It is possible for there to be multiple versions of shader programs for a given ray tracing pipeline stage. In one example, an application includes a large number of possible shader programs for the closest hit shader stage 310 (which may be referred to as "material shaders" or "material shader programs"). Each such shader program is associated with a different material. One material shader program may include instructions for both diffuse lighting and specular lighting, and a different material shader program may include instructions for specular lighting, but not diffuse lighting. The different material shader programs of an application may differ in a large variety of other ways, and an application may include a very large number of different material shader programs. In some implementations, the stitched shader program includes all shader programs to run as part of every stage of a ray tracing pipeline 300, and also includes instructions for appropriate control flow transfer between the different stages of the ray tracing pipeline 300.

One characteristic of a stitched shader program is that the resource usage for the entire stitched shader program is based on the maximum resource usage of all shader programs included in the stitched shader program. More specifically, shader programs are launched as "kernels" on the APD 116. A kernel specifies a particular shader program (e.g., a stitched shader program), as well as a number of work-items that will be executed as part of the kernel. In the ray tracing pipeline 300, each work-item would correspond to one ray generation shader execution (and thus the subsequent executions of the different stages of the ray tracing pipeline 300). The scheduler 136 breaks the kernel up into workgroups and assigns workgroups to one or more compute units 132 for execution. The workgroups of a kernel begin execution, execute their instructions, and then terminate execution.

The rate at which a shader program executes is dependent on the number of resources consumed by each unit of execution of the shader program. The term "unit of execution" may mean a workgroup, wavefront, or work-item. More specifically, there is a fixed number of computing resources, such as registers, cache memory, or higher level memory local to a compute unit 132. A register is typically the lowest level storage space available to execution units of a processor and instructions of the processor typically refer to registers by name (e.g., "r1" for register 1), instead of address as is typically the case for memory. Thus the number of units of execution that can execute concurrently is determined by the amount of such resources consumed by each unit of execution. In an example, a compute unit 132 includes 1000 registers and each wavefront of a shader program consumes 100 registers. Thus 10 wavefronts of the shader program could be executed concurrently on a compute unit 132 (assuming a sufficient number of other resources are available). If a kernel required 100 wavefronts to be executed, then if that kernel were to execute in one compute unit 132, 10 iterations of 10 wavefronts each would be required to execute. Modifying the register usage can potentially improve execution speed. In some situations, reducing the register usage improves the number of wavefronts that can concurrently execute and leads to improvement in execution time assuming the reduced register usage does not adversely impact the execution time of the wavefront. There may be other situations where letting computationally intensive shaders use more registers can improve the individual runtime of a wavefront that in turn helps the overall execution time.

A stitched shader program has resource usage requirements equal to the highest resource usage requirements of all shader programs from which the stitched shader program is formed. This is because resources are allocated upon launching a shader program as a kernel, and do not dynamically vary as execution of the kernel proceeds. In an example, if there are 10 different material shaders, and the material shader with the highest register usage requires ten registers, then the stitched shader program will require at least ten registers even though the other material shaders require a smaller number of registers.

For these reasons, in a stitched shader program, execution of particular sub-shader programs can be slowed down due to the resource requirements of other sub-shader programs in the stitched shader program. Techniques are therefore provided to reduce the impact of the relatively high resource requirements of one or more sub-shader programs on the performance of other sub-shader programs in a stitched shader program. Briefly, the techniques involve compiling and generating multiple versions of individual sub-shader programs and, at link time, selecting an appropriate version based on the resource requirements of the other sub-shader programs in the stitched shader program.

Figure 4:
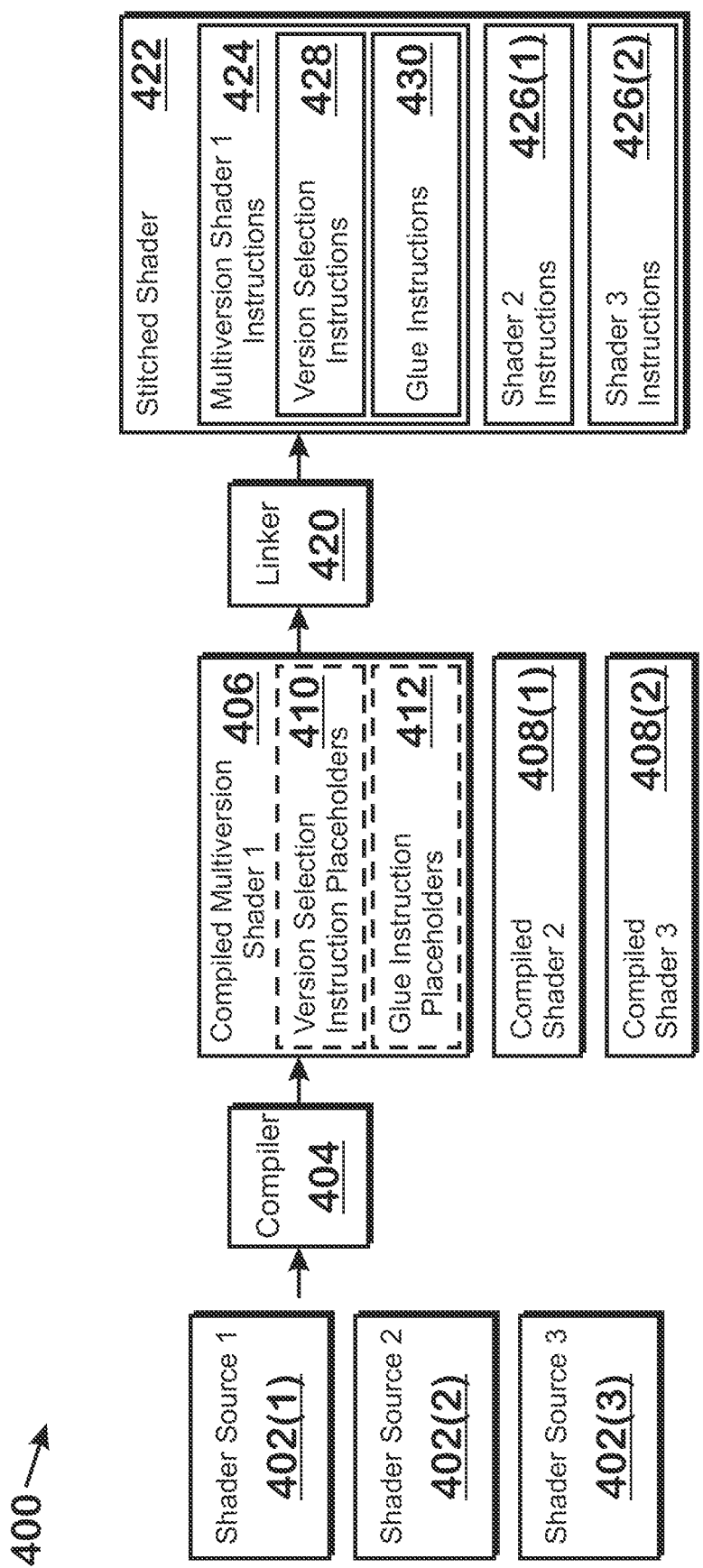
FIG. 4 illustrates a technique for generating a multi-version stitched shader program, according to examples.

FIG. 4 illustrates a technique for compiling a multiversion stitched shader program, according to examples. Specifically, FIG. 4 illustrates an example in which a compiler 404 compiles shader program source 402 to compiled versions of the individual shader programs 406/408, and then a linker 420 links those compiled version of the shader programs into a stitched shader program 422.

The shader source 402 represents source code for different shader programs (three shader programs are illustrated in FIG. 4). In some examples, this source code 402 is provided by an application developer and the compiler 404 is an application compiler that is used at development time. In such examples, the compiler 404 is the offline compiler 140 of FIG. 2. In other examples, the compiler 404 is a runtime compiler 144.

The compiled multiversion shader program 406 includes instructions for at least two versions of a corresponding shader source 402. More specifically, for at least one portion of at least one shader source 402, the compiler 404 generates two different versions of instructions and includes both versions in the compiled multiversion shader program 406. The two different versions of instructions use different numbers of a resource. The compiled multiversion shader program 406 also includes version selection instruction placeholders 410 and glue instruction placeholders 412. Some example techniques for generating compiled multiversion shader programs 406 are provided with respect to FIG. 5.

The linker 420 generates the stitched shader 422 from one or more compiled multiversion shaders 406 and one or more compiled shaders 408 (which are not multi-version). In brief, the linker 420 combines the instructions of the one or more compiled multiversion shaders 406 and the one or more compiled shaders 408, selects one or more versions of instructions of the compiled multiversion shaders 406 to use, and modifies the version selection instruction placeholders 410 and the glue instruction placeholders 412 to cause the stitched shader 422, when executed, to execute the selected versions of instructions and not the unselected versions of instructions.

The version selection instruction placeholders 410 are placeholders for version selection instructions 428 in the stitched shader 422. In some examples, placeholders are NOP instructions. In other examples, placeholders are default instructions configured to select a default version.

The version selection instructions 428 in the stitched shader 422 are configured to, when executed, select one of the versions instructions of the compiled multiversion shader 406. In an example, the compiled multiversion shader 406 includes two versions of instructions corresponding to the compiled multiversion shader 406. The version selection instructions 428 includes a NOP instruction (no-op, an instruction that, when executed, performs no operations) and a jump instruction. The NOP instruction is before the first version of instructions and thus allows that first version of instructions to execute. The jump instruction is placed after the first version of instructions and targets instructions after the second version of instructions, so that when executed, the second version of instructions is skipped. After selecting a particular version of instructions, the linker 420 modifies the version selection instruction placeholders 410, to generate the version selection instructions 428. When executed, the version selection instructions 428 cause execution control to flow to the selected version of instructions instead of the one or more non-selected versions of instructions.

The compiled multiversion shader 406 also includes glue instruction placeholders 412. The glue instruction placeholders 412 are placeholders for glue instructions 430 in the stitched shader 422. In an example, placeholders include one or more NOP instructions. In another example, the placeholders are default versions of the glue instructions. The purpose of the glue instructions 430 is to cause each version of instructions to behave the same way in terms of what inputs the version consumes and what outputs the version provides. In an example, a first version uses one register and a second version uses two registers. The first version leaves the output in the one register, named R1, and the second version leaves the output in the second register, named R2. Instructions subsequent to the two versions input the value in register R2. If the stitched shader 422 is configured to select the first version, then the glue instructions 430 include an instruction to move the value from R1 to R2, so that subsequent instructions will receive the intended input.

The placeholder instructions, the version selection instruction placeholders 410 and the glue instruction placeholders 412, are included in compiled multiversion shaders 406 due to the nature of the compilation and linking process, as well as the timing with which the contours of the stitched shader 422 (namely which shader programs are included) is determined. More specifically, compilation of shader source 402 occurs in a manner that generates machine-specific instructions, or device-independent instructions that are laid out in a memory address space. Instructions that transfer control flow within a compiled shader program (either the compiled multiversion shader program 406 or a compiled shader program 408), such as jumps and branches, therefore refer to memory addresses instead of labels. The placeholders exist to allow for the linker 420 to make appropriate modifications to select a particular version of instructions without having to recalculate these memory addresses. For example, conversion of a NOP to a jump or a jump to a NOP does not change the total number of instructions and therefore does not require a recalculation of the memory addresses. The presence of multiple versions of instructions in a single compiled multiversion shader 406 also allows the linker 420 to operate simply by changing a few instructions rather than having to remove large amounts of instructions and recalculate memory addresses. The above features allow the linker 420 to operate quickly, at runtime when an application is loaded. This quick linking assists in situations where the specific shaders to be included in the stitched shader 422 may not be known until runtime. In an example, an application developer may develop a large number of possible material shaders that could potentially be used in an application. However, the application does not determine which possible material shaders are actually used by assets that are to be used until the application is loaded, at which point the application examines the assets and identifies specific material shaders. The linker 420 then combines compiled versions of those shaders into the stitched shader 422 and performs the other operations described herein, such as modifying the version selection instruction placeholders 410 and glue instruction placeholders 412.

Note that the concept of "versions" for the different versions of instructions for a particular shader is different than the concept of versions for shaders at a particular stage of the ray tracing pipeline (or whatever other context the techniques described herein are used in). More specifically, the concept of different versions of instructions for a particular shader is one in which the linker 420 selects a particular version of instructions of a compiled multiversion shader 406 based on the resource usage of other shaders to be included in a stitched shader 422. Once the linker 420 identifies which versions of instructions to include, the linker 420 modifies the placeholder instructions so that the selected version will execute in the stitched shader 422 when the corresponding shader in that stitched shader 422 is to execute. Even though multiple sets of instructions are included in the stitched shader 422, at runtime, only one version of instructions—the version selected by the linker 420—can execute. The reason that the different versions of instructions are included in the multiversion shader instructions 424 is that, as stated above, the linker 420 is able to perform such selection in a relatively simple manner, by varying the version selection instruction placeholders 410 and the glue instruction placeholders 412. The concept of different versions of shaders for a single pipeline is that there are different runtime options for a particular stage of that pipeline. For example, it is possible for a ray to hit triangles having different materials. Thus each such alternative shader has the capability of being executed at runtime.

In linking the compiled shaders into the stitched shader 422, for each region for which alternative versions exist, the linker 420 selects one of the versions of instructions. Then the linker 420 modifies the version selection instruction placeholders 410 and the glue instruction placeholders 412 so that when the stitched shader 422 is executed (e.g., in the APD 116), the stitched shader 422 executes one of those alternative versions. Any technically feasible technique can be used by the linker 420 to select a version of instructions.

In one example of a technique for the linker 420 to select a version of instructions, the linker 420 first identifies the set of shaders to be included in the stitched shader 422. In one example, the application 126 instructs the linker 420 regarding which shaders are to be included in the stitched shader 422. Although an application 126 may include a large number of shaders that could possibly be used during execution, it is possible that the application 126 only knows exactly which shaders are going to be used during execution after examining data available at runtime. In an example, scene metadata indicates a list of assets to be included in a scene. The application 126 extracts a list of shaders from the list of assets and thereby determines that such shaders are to be included in the stitched shader 422.

The linker 420 examines the resource usage for all of the shaders in the set of shaders to be included in the stitched shader 422. As described elsewhere herein, each shader is capable of execution using one or more numbers of resources (e.g., a multiversion shader is capable of execution in different "modes," with different numbers of resources and a single version shader is capable of execution in a single mode, with one number of resources). The linker identifies the lowest number of resources that all shaders are capable of executing at, and generates the stitched shader 422 in a manner that selects the appropriate version(s) of the different versions of instructions by editing the version selection instruction placeholders 410 and the glue instruction placeholders 412 as appropriate. A version of instructions or shader is capable of executing with a higher number of resources than required, but is not capable of executing with a lower number of resources than required. For example, a shader that requires ten registers is capable of executing when allocated eleven registers, but not when allocated nine registers.

In an example, two shaders are to be included in a stitched shader 422. A first shader is a single version shader and requires ten resources. A second shader is a multiversion shader. A first version of the multiversion shader requires sixteen resources and a second version of the multiversion shader requires ten resources. Because ten is the lowest number that both shaders can operate at, the linker 420 selects the number ten and modifies the version selection instruction placeholders 410 and the glue instruction placeholders 412 of the multiversion shader to select the version of instructions that executes with ten resources, instead of the version of instructions that executes with sixteen resources. In another example, a first shader requires ten resources and a second, multiversion shader includes a first version of instructions that requires twelve resources and a second version of instructions that requires sixteen resources. In this example, the linker 420 selects the number twelve and modifies the version selection instruction placeholders 410 and the glue instruction placeholders 412 of the multiversion shader to select the version of instructions that executes with twelve resources, instead of the version of instructions that executes with sixteen resources.

It should be understood that a compiled multiversion shader 406 may have multiple regions, which each may be multiversion or single version regions. A region is simply a portion of a multiversion shader 406 that is smaller than the entire multiversion shader 406. In this situation, the multiversion shader 406 is capable of executing using any of the numbers of resources designated by the individual regions.

In a modified technique, the linker 420 examines performance characteristics of the different shaders and, based on the performance characteristics, selects a particular number of resources for the stitched shader 422 based on the performance characteristics. As described elsewhere herein, this selected number of resources is at least as high as the lowest number of resources that all shaders to be included in the stitched shader 422 are capable of operating at.

In an example, the performance characteristics include estimated execution times for the single version shaders and regions as well as for the different versions of instructions of multiversion shaders. More specifically, the linker 420 estimates total execution times associated with particular versions of instructions for multiversion shaders. The performance characteristics also include estimated slowdown factor for the stitched shader 422 at different resource numbers being considered. In an example, the slowdown factor is based on the degree to which occupancy of the stitched shader 422 suffers when run with higher numbers of resources required in the APD 116. In an example, if two resource numbers being considered are five and ten, then the slowdown factor is a factor of two, since half as many instances of the stitched shader 422 may be executed concurrently in a given execution unit. In another example, the slowdown factor is based on how much the individual runtime of a workitem is affected at different resource usages. A shader workitem may be individually faster when using more registers. In other instances, the slowdown may be a combination of both concurrency and individual runtime.

The linker 420 compares total execution times of the stitched shader 422 at different numbers of resources with the slowdown factors associated with the increases in resource usage and selects the resource usage that produces the best overall performance. In an example, there are two possible resource usage numbers: eight registers and twelve registers. Selecting twelve registers would result in a slowdown factor of ⅔ (because only two thirds as many execution instances such as wavefronts could execute concurrently) but selecting twelve registers reduces the overall execution time of the stitched shader time by one half, and therefore the linker 420 selects twelve registers as the number of registers to use for the stitched shader 422. Any other technically feasible technique for selecting a number of resources to use for a stitched shader 422 could alternatively be used.

Part of compilation, by the compiler 404, is determining whether any particular shader program should be compiled as a multiversion shader 406 or as a non-multiversion shader 408. For a given shader program that the compiler 404 has determined should be compiled as a multiversion shader 406, the compiler 404 also determines the number of versions of instructions to generate and the number of resources to target for each version.

Figure 5:
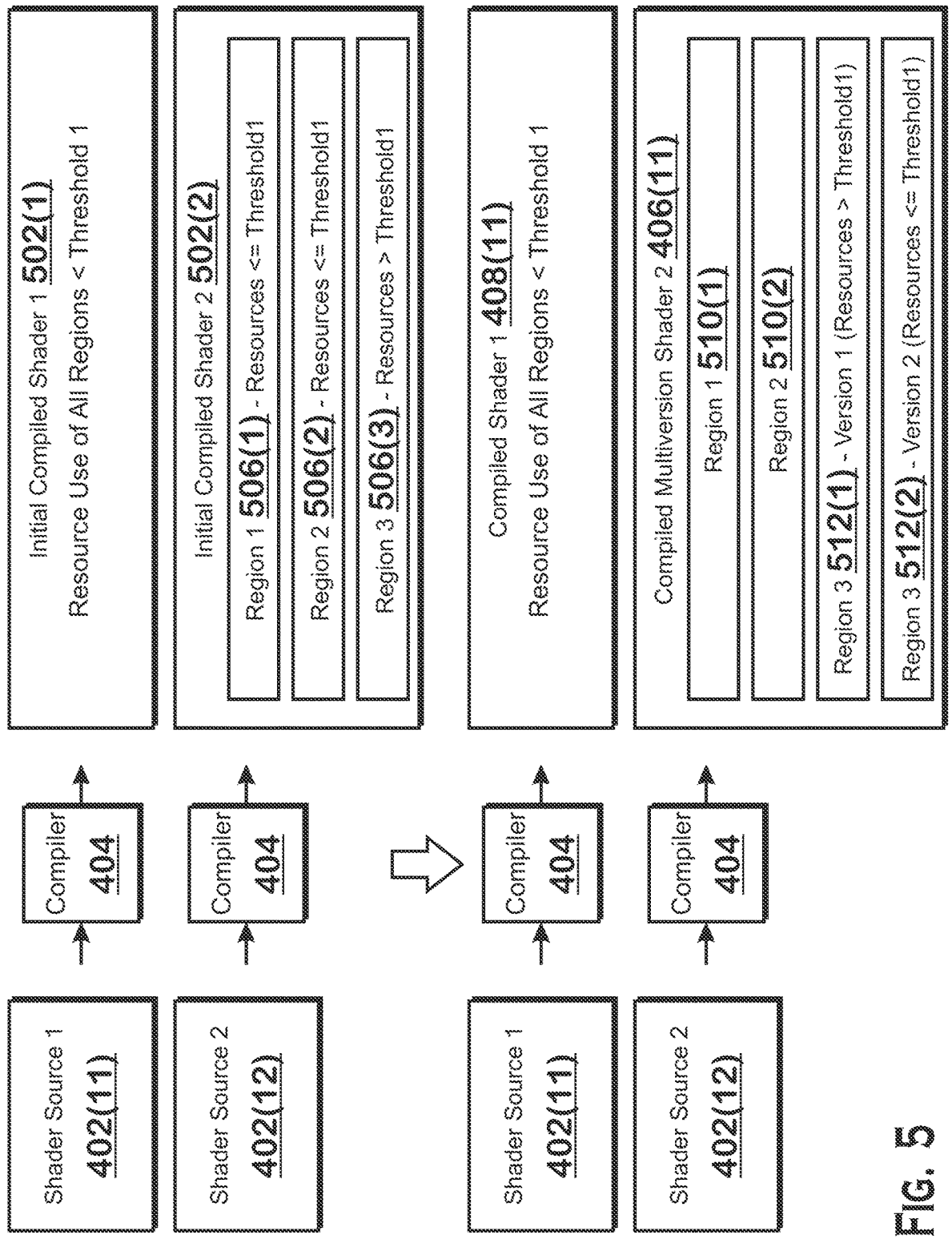
FIG. 5 illustrates a technique for compiling shader programs to generate one or more compiled multiversion shaders, according to an example.

FIG. 5 illustrates a technique for compiling shader programs to generate one or more compiled multiversion shaders, according to an example. According to the technique, a compiler 404 compiles one or more shader sources 402 to generate initial compiled shaders 502. The compiler 404 performs this compilation step without generating any multiversion shaders, in order to identify the resource usage for the shaders. The initial compiled shaders 502 therefore do not include multiversion shaders. The compiler 404 determines, for each region 506, the number of resources that particular region needs. The compiler 404 may use any technically feasible technique to divide compiled shaders 502 into regions. A region is a sub-set or whole of a shader program. In some examples, resources are registers, but may be any other type of execution resources.

The compiler 404 sets a resource usage threshold and determines whether each region 506 is below or above the set threshold. The compiler 404 recompiles the shader sources 402 based on the determination of which regions 506 are above the threshold. For a region 506 having resource usage above the threshold, the compiler 404 recompiles that region 506 as a compiled multiversion shader 406 that includes two or more versions for the region 506. One of the versions is a version unmodified by a resource use reduction technique that would reduce the resource usage as compared with the version The other version is the version that is modified by the compiler to reduce resource usage to less than or equal to the threshold. The compiler 404 includes each of those generated versions into the compiled multiversion shader 406. For a region 506 having resource usage below or equal to the threshold, the compiler 404 retains the version of that region 506 as compiled in an initial compiled shader 502. For shader programs where all regions 506 have resource usage below the threshold, the compiler 404 marks the initial compiled shader 502 as the compiled shader 408 to be included in the stitched shader program 422. For shader programs where at least one region 506 has resource usage above the threshold, the compiler 404 recompiles the shader program as a compiled multiversion shader 506 that includes at least two versions of the at least one region 506 that has resource usage above the threshold. At least one version has resource usage less than or equal to the threshold and at least one other version has resource usage above the threshold. At least one such version may be an unmodified version of the region 506, that is, the version of the region in the initial compiled shader 506.

One example resource is number of registers used. One example technique for reducing the number of registers used by a region or shader is register spilling. In register spilling, the compiler 404 begins with a first form of compiled instructions that uses a number of registers above a threshold. Then the compiler 404 identifies a subset of the number of registers to "spill" into memory (such as a local memory in the compute unit 132). The compiler 404 then converts instructions that use this subset of registers into instructions that read from and write to memory. The result is that the remaining set of instructions uses a number of registers less than or equal to the threshold. It should be noted that the difference between "registers" and "memory" is that registers are low latency but low capacity memory elements while "memory" has a higher latency but higher capacity than registers.

Although a particular technique has been described to reduce the number of registers below a threshold, any technically feasible technique for reducing registers below a threshold may be used. The resource that is analyzed by the compiler 404 for generating multiversion shaders may also be a resource other than registers, in which case any other technically feasible technique to reduce such registers may be used.

Part of generating the multiversion shaders includes determining the threshold that triggers generation of a multiversion shader 406 from a shader source 402. Any technically feasible technique for determining this threshold may be used. In one example, the compiler 404 analyzes all compiled shaders for an application 126 to obtain initial resource usage for each such compiled shader. The compiler 404 also obtains a threshold percentage, which can be pre-programmed. The compiler 404 identifies the lowest resource usage number such that the percentage of all compiled shaders having at most that resource usage number is at or above the threshold percentage. In an example, an application includes ten shaders and the threshold percentage is 90%. Eight of the shaders use ten registers. A ninth shader uses twelve registers. A tenth register uses fifteen registers. The compiler 404 identifies the number twelve as the threshold number of resources, because 90% of the shaders have register usage at or below twelve. If the threshold percentage were 80%, then the compiler 404 would identify the number ten as the threshold number of resources, because 80% of the shaders have register usage at or below ten. In response to identifying this threshold number of resources, the compiler 404 would recompile each of the shaders having a greater number of resource usage to generate a compiled multiversion shader 406, in accordance with the techniques described herein.

In a more general technique, the compiler 404 generates multiversion shaders 406 as follows. The compiler ranks the shaders by performance impact. Performance impact may be determined based on hints from the user, based on information obtained by running the shaders, or through any other technique for measuring performance impact. Then, shaders are compiled with versions based on the resource usage of all shaders that are compiled. In some implementations, the performance impact ranks affect how or whether the shaders are converted to multiversion shaders 406. The rankings based on performance impact may assign a performance score based on the total measured or estimated runtime of the shader when run as part of an application. In some implementations, shaders ranked as having "low" (below a first score threshold) performance impact simply have their registers reduced, with no multiversion shaders 406 generated. In some implementations, shaders ranked as having "high" (above a second score threshold, where the second score is higher than the first score) performance impact are compiled as multiversion shaders 406 so that at link time, the linker can select an appropriate version based on the other shaders that are to be linked together. In some implementations, shaders having "high" and "middle" performance impact (where middle is between the first and second thresholds) are both compiled as multiversion shaders, but shaders having a high performance impact do not have as much of a resource reduction as shaders having a middle performance impact.

It should be understood that throughout the present disclosure, the versions of instructions are different "versions" in the sense that the different versions have different resource utilization. However, different versions of the same region of a shader program perform the same function. In other words, when the compiler 404 generates multiple versions of instructions for the same region, the compiler generates two different sets of instructions that perform the same operations on the same set of inputs to generate the same set of outputs. The difference between two versions generated for the same region 506 is in the number of resources used by a particular version.

Figure 6:
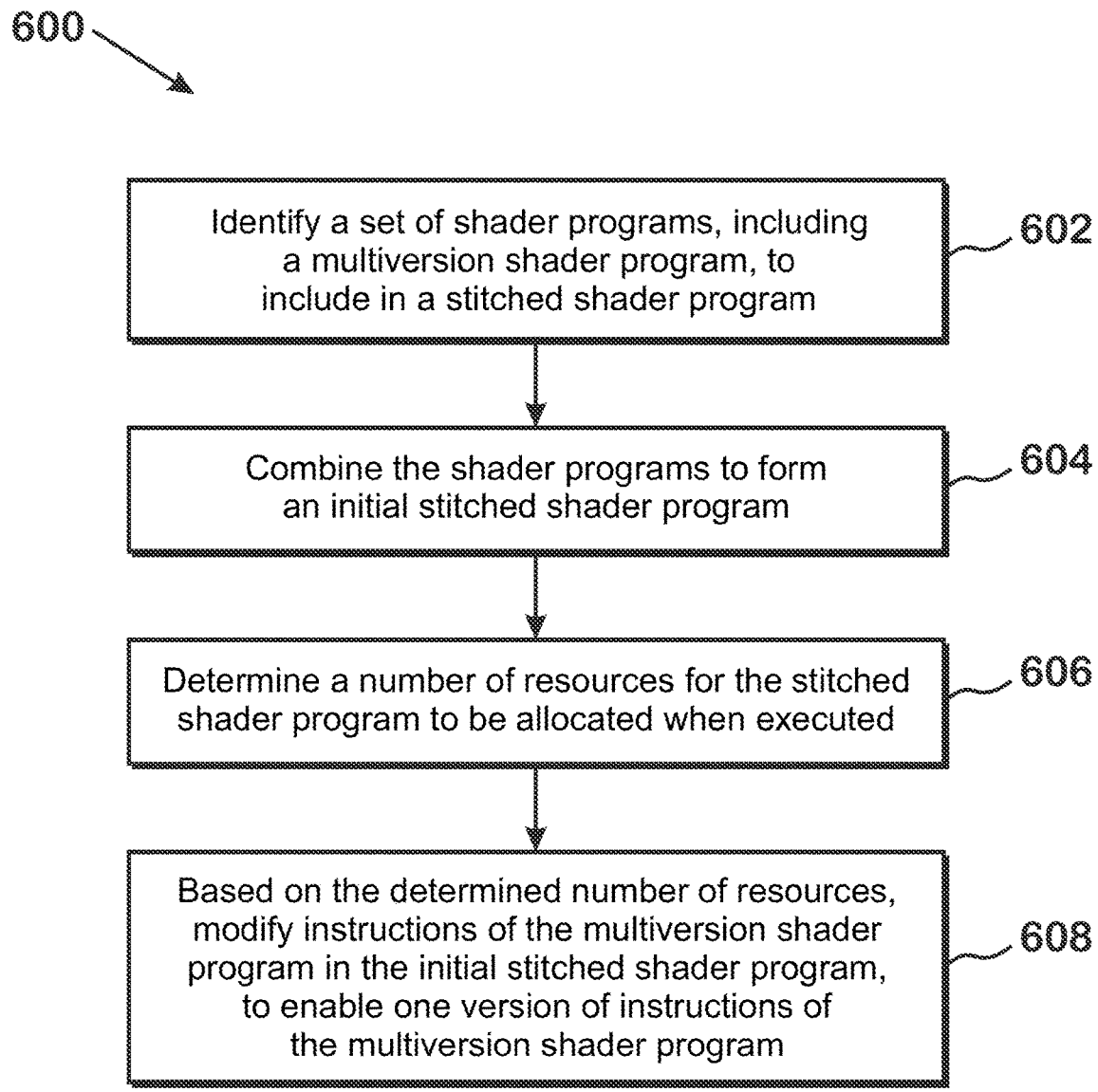
FIG. 6 is a flow diagram of a method for generating a stitched shader program from a set of shader programs including at least one multiversion shader program, according to an example.

FIG. 6 is a flow diagram of a method 600 for generating a stitched shader program from a set of shader programs including at least one multiversion shader program, according to an example. Although described with respect to the system of FIGS. 1-5, it should be understood that any system, configured to perform the steps of the method 600 in any technically feasible order, falls within the scope of the present disclosure.

The method 600 begins at step 602, where a linker 420 identifies a set of shader programs to include in a stitched shader program 422. The set of shader programs includes a multiversion shader program. Some details for identifying a set of shader programs to include in a stitched shader program 422 are provided in the disclosure describing FIGS. 4 and 5, while other details may be found elsewhere herein. In some implementations, a set of compiled shader programs, including at least one multiversion shader program, are included with an application program and the linker 420 identifies a subset of those shader programs to combine at runtime into a stitched shader program for dispatch onto an APD 116 for execution.

At step 604, the linker 420 combines the identified shader programs to form an initial stitched shader program. In addition to combining the shader programs, the linker 420 may also include other code that manages control flow between the shaders based. In an example, the stitched shader program implements a ray tracing pipeline such as the example ray tracing pipeline 300 of FIG. 3. The linker thus includes in the stitched shader program instructions to control flow between the various stages of the pipeline, which are implemented by the shader programs from which the stitched shader program is generated. There may be multiple different versions of shader programs for any given stage of the ray tracing pipeline 300. In an example, because there may be many different materials in a scene, there may be a wide variety of material shader programs to implement the closest hit shader stage 310, where selection of a particular material shader for a given ray depends on the identity of the triangle that is hit by the ray.

At step 606, the linker 420 determines a number of resources for the stitched shader program to be allocated when executed. This analysis may be performed in any technically feasible manner, and some example details for determining the number of shaders are provided with respect to FIGS. 4 and 5.

At step 608, based on the determined number of resources, the linker 420 modifies instructions of the multiversion shader program in the initial stitched shader program, to enable one version of instructions of the multiversion shader program. Details for modifying such instructions are provided herein, for example with respect to FIGS. 4 and 5.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for generating a stitched shader program, the method comprising:
    identifying a set of shader programs to include in the stitched shader program, wherein the set of shader programs includes at least one multiversion shader program that includes a first version of instructions and a second version of instructions, wherein the first version of instructions uses a first number of resources that is different than a second number of resources used by the second version of instructions, and wherein the set of shader programs also includes a second shader program different from the multiversion shader program;
    combining the set of shader programs to form the stitched shader program, wherein the stitched shader program includes instructions corresponding to the at least one multiversion shader program and instructions corresponding to the second shader program;
    determining a number of resources for the stitched shader program based on resource usage of the second shader program; and
    based on the determined number of resources, modifying the instructions within the stitched shader program, the instructions being from the at least one multiversion shader program, to execute either the first version of instructions or the second version of instructions, when the at least one multiversion shader is executed.

2. The method of claim 1, wherein determining the number of resources for the stitched shader program comprises:
    identifying, as the number of resources, a lowest number of resources that all shader programs of the set of shader programs are capable of executing with.

3. The method of claim 1, wherein determining the number of resources for the stitched shader program comprises:
    selecting the number of resources based on performance characteristics of the set of shader programs.

4. The method of claim 1, wherein modifying the instructions corresponding to the multiversion shader program comprises:
    modifying version selection instruction placeholders.

5. The method of claim 1, wherein modifying the instructions corresponding to the multiversion shader program comprises:
    modifying glue instruction placeholders.

6. The method of claim 1, further comprising:
    compiling a first shader program to generate the at least one multiversion shader program.

7. The method of claim 6, further comprising:
    analyzing resource utilization of initial compiled shaders for shader programs specified by an application to determine a threshold; and
    in response to determining that an initial compiled shader corresponding to the at least one multiversion shader program utilizes a number of resources above the threshold, generating the at least one multiversion shader program.

8. The method of claim 1, wherein the identifying the set of shader programs to include in the stitched shader program is performed at runtime based on assets specified to be included in a scene for an application.

9. The method of claim 1, wherein:
    the first version of instructions and the second version of instructions perform the same operations on the same input to generate the same output but utilize a different number of resources.

10. A computing device configured to generate a stitched shader program, the computing device comprising:
    a memory; and
    a processor configured to execute a linker, the linker configured to:
        identify a set of shader programs to include in the stitched shader program, wherein the set of shader programs includes at least one multiversion shader program that includes a first version of instructions and a second version of instructions, wherein the first version of instructions uses a first number of resources that is different than a second number of resources used by the second version of instructions, and wherein the set of shader programs also includes a second shader program different from the multiversion shader program;

combine the set of shader programs to form the stitched shader program, wherein the stitched shader program includes instructions corresponding to the multiversion shader program and instructions corresponding to the second shader program;

determine a number of resources for the stitched shader program based on resource usage of the second shader program; and based on the determined number of resources, modify the instructions corresponding to the at least one multiversion shader program to execute either the first version of instructions, or the second version of instructions, when the at least one multiversion shader is executed.

11. The computing device of claim 10, wherein determining the number of resources for the stitched shader program comprises:

identifying, as the number of resources, a lowest number of resources that all shader programs of the set of shader programs are capable of executing with.

12. The computing device of claim 10, wherein determining the number of resources for the stitched shader program comprises:

selecting the number of resources based on performance characteristics of the set of shader programs.

13. The computing device of claim 10, wherein modifying the instructions corresponding to the multiversion shader program comprises:

modifying version selection instruction placeholders.

14. The computing device of claim 10, wherein modifying the instructions corresponding to the multiversion shader program comprises:

modifying glue instruction placeholders.

15. The computing device of claim 10, further comprising a compiler configured to:

compile a first shader program to generate the at least one multiversion shader program.

16. The computing device of claim 15, wherein the compiler is further configured to:

analyze resource utilization of initial compiled shaders for shader programs specified by an application to determine a threshold; and in response to determining that an initial compiled shader corresponding to the at least one multiversion shader program utilizes a number of resources above the threshold, generate the at least one multiversion shader program.

17. The computing device of claim 10, wherein the identifying the set of shader programs to include in the stitched shader program is performed at runtime based on assets specified to be included in a scene for an application.

18. The computing device of claim 10, wherein:

the first version of instructions and the second version of instructions perform the same operations on the same input to generate the same output but utilize a different number of resources.

19. A non-transitory computer-readable medium storing instructions that, when executed by a processor, cause the processor to generate a stitched shader program, by:

identifying a set of shader programs to include in the stitched shader program, wherein the set of shader programs includes at least one multiversion shader program that includes a first version of instructions and a second version of instructions, wherein the first version of instructions uses a first number of resources that is different than a second number of resources used by the second version of instructions, and wherein the set of shader programs also includes a second shader program different from the multiversion shader program;

combining the set of shader programs to form the stitched shader program, wherein the stitched shader program includes instructions corresponding to the multiversion shader program and instructions corresponding to the second shader program;

determining a number of resources for the stitched shader program based on resource usage of the second shader program; and based on the determined number of resources, modifying the instructions corresponding to the at least one multiversion shader program to execute either the first version of instructions, or the second version of instructions, when the at least one multiversion shader is executed.

20. The non-transitory computer-readable medium of claim 19, further storing instructions that, when executed by the processor, cause the processor to:

compile a first shader program to generate the at least one multiversion shader program.

* * * * *